United States Patent [19]

Hoffmann et al.

[11] Patent Number: 4,536,291

[45] Date of Patent: Aug. 20, 1985

[54] TUBULAR FILTER ELEMENT WITH MATED END CAPS

[75] Inventors: Jürgen Hoffmann, Diemarden; Günter Pradel, Göttingen; Fritz Reulecke, Adelebsen, all of Fed. Rep. of Germany

[73] Assignee: Sartorius GmbH, Fed. Rep. of Germany

[21] Appl. No.: 611,532

[22] Filed: May 17, 1984

[30] Foreign Application Priority Data

May 25, 1983 [DE] Fed. Rep. of Germany ....... 3318940

[51] Int. Cl.³ .................. B01D 27/08; B01D 29/14
[52] U.S. Cl. ................................ 210/457; 210/484; 210/493.1; 210/497.01; 55/498; 55/503
[58] Field of Search ............... 210/437, 441, 445, 450, 210/451, 452, 455, 457, 484, 485, 493.2, 493.5, 498, 493.4, 497.1, 232, 493.1, 497.01; 55/492, 496, 497, 502, 521, 529, 498, 503

[56] References Cited

U.S. PATENT DOCUMENTS

| | | | |
|---|---|---|---|
| 2,919,765 | 1/1960 | Kasten | 210/493.2 |
| 3,246,766 | 4/1966 | Pall | 210/493.5 |
| 3,720,323 | 3/1973 | Landree | 210/493.2 |
| 3,937,281 | 2/1976 | Harnsberger | 210/497.1 |
| 4,032,688 | 6/1977 | Pall | 210/497.1 |
| 4,402,830 | 9/1983 | Pall | 210/493.2 |

*Primary Examiner*—Richard V. Fisher
*Assistant Examiner*—Wanda L. Millard
*Attorney, Agent, or Firm*—Eric P. Schellin

[57] ABSTRACT

There is disclosed an axially folded tubular filter element for the filtration of fluids. The ends of the radially extending folds are in abutment at the internal folds with a support core and in abutment at the externally facing folds internally with an outer support grid. The support has a plurality of perforations. The ends of the tubular filter element are enclosed by a cap which encloses the ends of the tubular filter element in a sealing manner. The outside of the support core which supports the internally facing fold edges has a series of outwardly extending corrugated sections with rounded corrugated outwardly extending ridges, and the said perforations are located in the valleys of the corrugations. The corrugated structure extends in a longitudinal direction, is relatively flat and runs in a circumferential direction. A drainage pathway is also supplied along the outer surface of the support core.

10 Claims, 2 Drawing Figures

U.S. Patent Aug. 20, 1985 4,536,291

TUBULAR FILTER ELEMENT WITH MATED END CAPS

BACKGROUND OF THE INVENTION

The invention concerns a tubular filter element for the filtration of fluids, the filter sheet or membrane has at least one layer and is folded in a plurality of axial folds, the end folds of which are connected in a leakproof manner in a hollow cylinder which is carried by an outer support grid and by an inner, perforated plastic support core on the outside of which the fold edges of the filter sheet are supported and the ends of which are enclosed by annular caps which enclose the front sides of the tubular filter sheet in a sealing manner. Such filter elements are known, for example, from DE-OS No. 31 28 546, DE-OS No. 21 02 510 and DE-GM No. 81 33 548.2. In known filter elements of this type the support core itself consists of a cylindrically formed grid with relatively sharp-edged perforations and with support ribs running circumferentially. The plurality of the fold edges come to lie against these support ribs during filtration as a result of the pressure gradient from the outside to the inside of the hollow cylindrical filter element. There is a danger in the case of sensitive filter materials that such could be damaged on the support core. An attempt has been made to avoid this by protecting and stabilizing the sensitive filter materials on both sides by a fine network. In addition to the task of supporting the filter, the support core also has the task of forming drainage pathways for the filtrate passing through the filter sheet from the closely pressed-together fold edges of the filter sheet. Both the outer support grid and the inner support core are enclosed at their ends by two caps which enclose the end edges of the folded tubular filter element by means of potting for example to achieve a good seal. Thus, the connection of the two caps is established via the tubular filter element connected therewith and usually via at least one of the two supports. Additional expansion forces affect the interconnected construction parts as a result of the dynamic forces acting on the entire filter element during filtration and as a result of stresses during extreme variations in temperature, e.g. during repeated autoclaving of the filter element for reasons of sterilization, so that these forces too must be taken into consideration during the construction of the filter element. The known filter elements of the art required improvement in this respect.

SUMMARY OF THE INVENTION

The invention is to an improved support and the enclosure for a cylindrical filter sheet and provision for drainage on the filtrate side, as well as improving the stability of the joining of the individual elements.

A corrugated filter structure achieves a good drainage and avoids sharp edges as support surfaces are the fold edges of the filter element. A flange guiding means of the ends of a support core into the two caps and securing them against rotation assures the possibility of the axial and longitudinal expansion of the support core inside the two caps and sufficient distortion rigidity is assured by the intermeshing corrugation of both construction parts. This also applies to the distortion rigidity of the outer support grid with the aid of disclosed fixing means. The outer support grid is preferably permanently connected to the annular caps.

The concept of the invention is explained in more detail in an embodiment with reference made to the drawings.

Figure 1:
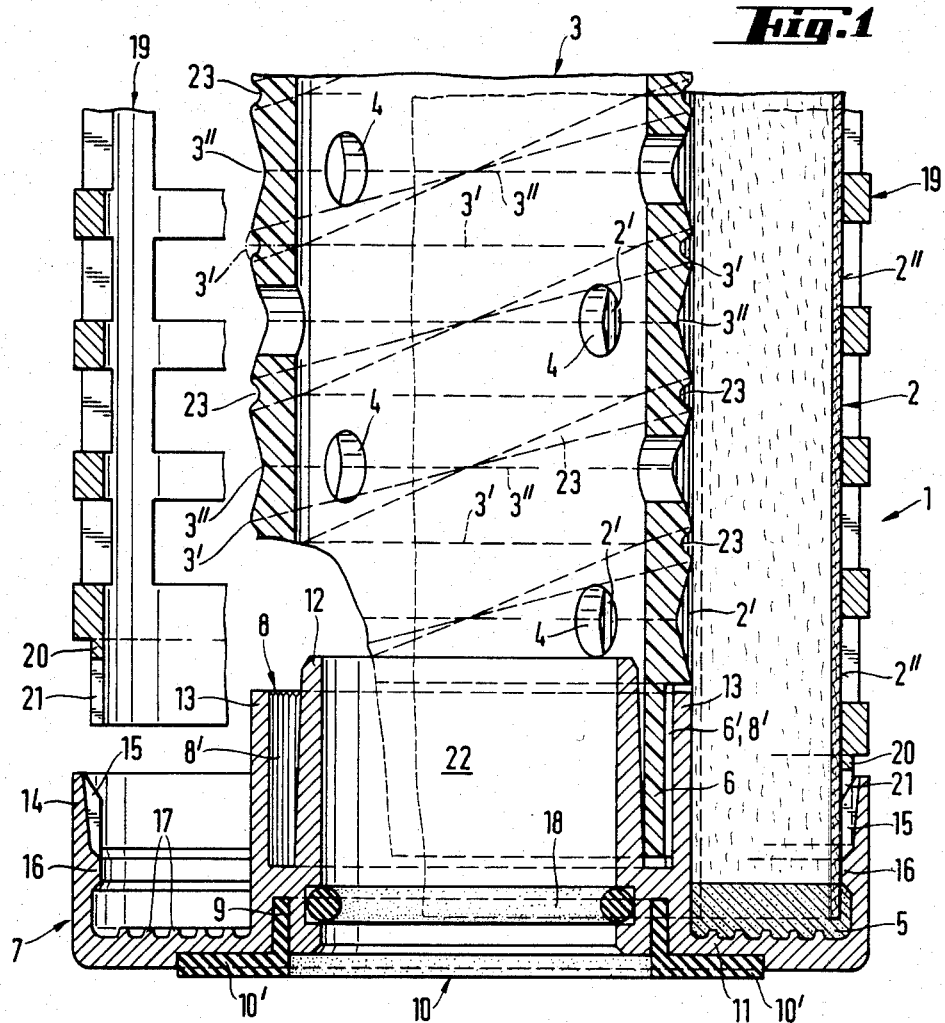
FIG. 1 shows a fragmentary vertical section through a filter means, wherein the assembly thereof has been completed on the right side of the drawing, while the parts before assembly are shown on the left side of the drawing.
Figure 2:
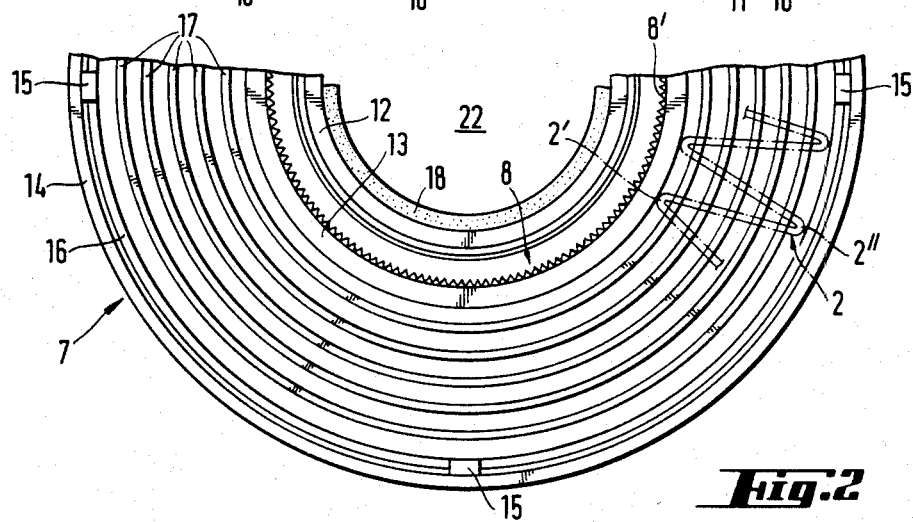
FIG. 2 shows a fragmentary top view of an annular end cap without the filter means being assembled thereto.

Filter element 1, generally, consists essentially of single or multilayer filter sheet 2, support core 3 with a plurality of perforations 4, annular cap 7 located at an end with annular seals 10 and 18 and the outer support grid.

Filter sheet 2 is folded in a plurality of folds and formed into a hollow cylinder; the end folds are connected to each other in a leakproof manner, as is known in the state of the art mentioned in the foregoing. Axially positioned fold edges 2' and 2" are adapted and constructed to lie against either corrugated ridges 3' of the said support core 3 or against the surfaces of support grid 19, depending on the pressure gradients. As a rule, the fluid medium to be filtered presses externally through filter sheet 2 in the direction of support core 3, so that the latter is exposed to the greatest pressure load and must accordingly have the necessary stability. The stability is favored by the corrugated structure and efficacious drainage is achieved by means of the fact that each of the said perforations 4 are located at the apexes of corrugation valleys 3". The corrugated structure extends in a longitudinal direction, has a relatively flat V-shaped profile and runs in a circumferential annual direction. The drainage can be improved even more by putting helical grooves 23 in corrugated structure 3', 3" which are rounded in profile.

Support core 3 merges on both of its respective annular ends into annular closed tube section 6 defined by upstanding spaced cylindrical walls 13 and 12. The support core portion in closed annular type 6 is provided on its outside with axially extending corrugation 6'.

Annular cap 7 is essentially U-shaped in section and has hollow cylindrical section 8 whose axially upstanding wall 13 carries a corresponding mating corrugation 8' which meshes into corrugation 6' of tube section 6 of support core 3. Wall 8 of annular cap 7 surrounds outlet 22 of filter element 1, which carries off the filtrate. Outlet 22 is sealed off by annular seals 10, 18 from a receiving housing (not shown) in such a manner that the outer space surrounding filter element 1 is separated from the inner space in a leakproof manner and the medium to be filtered can pass only through filter sheet 2. One of seals 10, 18 can be eliminated, depending on the construction of the receiving housing.

Recess 9 for receiving axially projecting and axially acting annular seal 10 is located in a direct axial extension of hollow cylindrical section 8 along cap bottom 11. In the example shown the annular seal 10 has an L-shaped section and free L shank 10' partially extends radially over the outside of cap bottom 11. Cap bottom 11 has bottom inwardly and upwardly corrugations 17 consisting of concentric annular webs on its inner side which form the receiving area for sealant 5 with which the upper and lower ends of tubular filter 2 are sealingly potted and connected to cap bottom 11. Sealant 5 can be a fusion adhesive, a sealing resin or also molten material of filter sheet 2 or of cap bottom 11.

In order to prevent sealant 5 from rising too high and thus decreasing the effective filter surface when the front surfaces of filter sheet 2 are immersed, circular sealing barrier 16 is positioned internally in upwardly extending flange section 14 of annular cap 7, against which a portion of the outer fold edges of filter sheet 2 also rest.

Support core 3 is not positively connected in a longitudinal direction to annular cap 7 in the embodiment shown, but rather is secured against rotation in a circumferential direction only by corrugation 6', 8'. Therefore, relatively massive support core 3 can expand axially and longitudinally during sharp variations in temperature without the resulting forces being transferred to the other parts of the filter element.

Outer support grid 19 is likewise secured in a circumferential direction against rotation by several fixing lugs 15 internally of upwardly extending flange section 14 and by providing slits 21 on a guide section 20 of the support grid 19. (The inverse arrangement is also possible.) If more height is desired in addition to the existing axial connection of the annular cap 7 over the ends of filter sheet 2 and sealant 5, support grid 19 can be connected to upwardly extending flange section 14 of the annular caps 7 by adhesion or welding.

In the foregoing, only the annular cap 7 has been discussed with particularity. The other end may be supplied with a cap of the same configuration but without the centrally disposed port and concomitant seals 10 and 18. Total fluid flow is from the support grid 19 through to outlet 22.

What is claimed is:

1. A tubular filter means for filtration of a fluid, comprising: a filter sheet, wherein said sheet is folded and disposed into a cylindrical like-shape whereby the fold edges extend axially, a cylindrical support core having a plurality of perforations, the filter sheet is disposed outside of the cylindrical support core, at least one annular cap positioned at the end of the filter sheet and the cylindrical support core, the filter sheet is sealingly affixed to the cap, the cap is provided with two concentric inwardly axially extending spaced walls, the outer most concentric spaced wall is provided with inwardly extending axially oriented corrugations, the cylindrical support core is provided with an end portion which is embraced between the two concentric spaced walls and which is provided with outwardly extending axially oriented corrugations that mate with the inwardly extending corrugations of the outer concentric spaced wall, these corrugations preventing rotation of the cylindrical support core while also permitting axial expansion and contraction of the support core in relation to the annular cap.

2. A tubular filter means of claim 1 further comprising a cylindrical support grid that is outwardly spaced from the cylindrical support core so that the filter sheet is located between the support core and the cylindrical support grid.

3. A tubular filter means of claim 2 wherein the cylindrical support core has an external facing provided with a plurality of circumferential valleys having extending ridges and recesses therebetween, the extending ridges are rounded and constructed to lie in abutment against the inwardly extending folds of the cylindrical filter sheet, the perforations of the cylindrical support core are positioned in the recesses of the valleys.

4. A tubular filter means of claim 3 wherein the annular cap is provided with an annular recess constructed to receive a portion of an annularly disposed gasket.

5. A tubular filter means of claim 4 wherein the innermost of the two concentric spaced walls extends axially for a greater distance than the outermost of the concentric spaced walls.

6. A tubular filter means of claim 5 wherein the annular cap has an outer axial annular flange extending in the same direction as the two concentric spaced walls and has facing inwardly radially means constructed to mate with means on an end portion of said support grid whereby the annular cap and the support grid maybe affixed together.

7. A tubular filter means of claim 6 wherein internally the outer axial annular flange is provided with an annular inwardly radially extending thickened portion.

8. A tubular filter of claim 7 wherein at least one end portion of the cylindrical filter sheet is potted in the annular gap at a bottom thereof between the outermost of the two concentric spaced walls and said axial annular flange.

9. A tubular filter means of claim 8 wherein said bottom of said annular cap is supplied with a plurality of concentric ribs.

10. A tubular filter means of claim 9 wherein the cylindrical support core is provided with helical drainage grooves along the side thereof having the valleys.

* * * * *